Feb. 23, 1960     D. W. SOUZA     2,925,625
CONTRAST COLOR EMBOSSED PLASTICS AND METHOD OF PRODUCTION
Filed Oct. 22, 1958
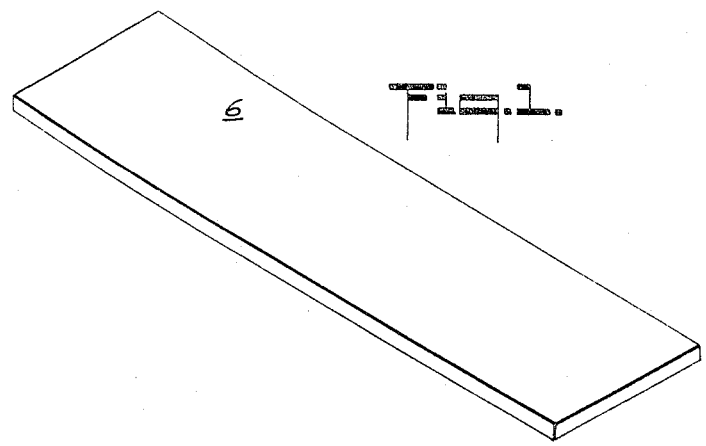
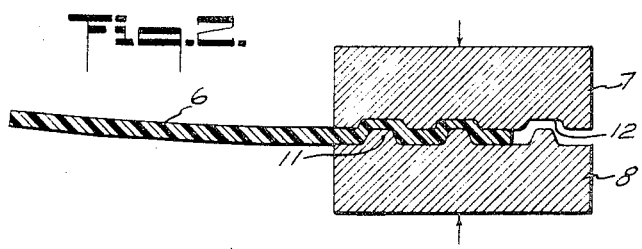
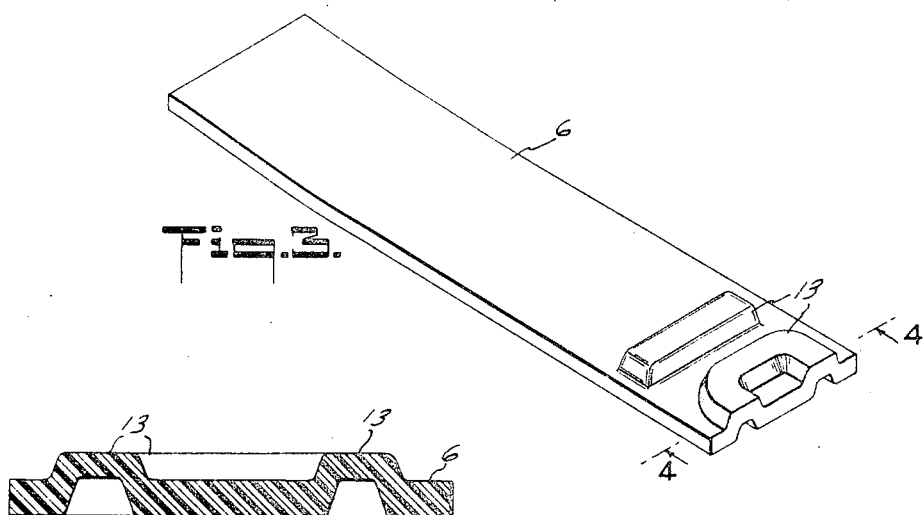
INVENTOR.
DAVID W. SOUZA
BY
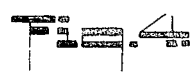
ATTORNEYS

United States Patent Office 2,925,625
Patented Feb. 23, 1960

2,925,625

CONTRAST COLOR EMBOSSED PLASTICS AND METHOD OF PRODUCTION

David W. Souza, Oakland, Calif., assignor to Dymo Industries, Inc., Berkeley, Calif., a corporation of California Application October 22, 1958, Serial No. 768,897

13 Claims. (Cl. 18—61)

The present invention relates, in general, to the provision of contrast color lettering or enfigurement upon a plastic sheet and, more particularly, to a cold forming or embossment method for providing contrast color relief enfigurement of plastic sheets, materials for use therein, and to the product. This application is a continuation-in-part of my copending application Serial No. 696,100, filed November 13, 1957.

Conventionally, contrast colored embossment of thermoplastic materials is effected in separate operations of hot molding followed by cooling to provide the raised portions followed by application of print or dye to the raised portions. Other expedients such as the engravement of certain plastics or multi-varicolored layered plastics have been employed for the same purpose.

I have now discovered that a contrast color embossment may be provided on sheeted thermoplastic resins formulated and/or processed as noted hereinafter merely by means of cold forming methods such as cold drawing or embossing cold material in cold dies. In this manner, plastic articles such as labels, signs, plates, etc., having contrasting colored embossments are produced quickly, conveniently and without complicated or expensive equipment from materials formulated and formed in accordance with the invention.

Accordingly, it is an object of my invention to provide plastic articles having contrasting colored embossments produced by cold forming methods.

Another object of my invention is to provide a method in which a sheeted thermoplastic resin is subjected to a cold forming or embossing operation to produce a raised portion having a color strongly contrasting with the original background color of the plastic.

A further object of my invention is to provide a plastic material having a uniform color value in sheet or tape form which may be subjected to localized cold drawing deformations to produce contrast color embossments thereon.

A still further object of my invention is to provide a plastic material in a form adaptable to cold die embossment or other form of cold flow deformation so as to create embossed or raised areas of contrasting color value thereon.

Still another object of my invention is to provide a method in which a sheet or ribbon of cold colored thermoplastic resin is embossed by means of cold dies to produce thereon white or other contrasting colored lettering.

The invention possesses other objects and features of advantage, some of which, with the foregoing, will be set forth in the following description of the preferred form of the invention which is illustrated in the drawing accompanying and forming part of the specification. It is understood, however, that variations in the showing made by said drawing and description may be adopted within the scope of the invention as set forth in the claims.

Referring to said drawing:

Figure 1 is a perspective view of a sheet of thermoplastic resin prior to embossment;

Figure 2 is a cross-sectional view of the plastic sheet being embossed by means of a mating set of embossing dies;

Figure 3 is a perspective view of the sheet after embossment;

Figure 4 is a cross-sectional view of the sheet taken substantially along the plane of line 4—4 of Figure 3.

My invention is predicated on the discovery that certain rigid plastic sheet materials develop a highly contrasting or opaque color value in regions subjected to cold flow, i.e., viscoelastic deformation. A variety of means may be employed to effect such deformation whereby various decorative and highly utilitarian articles may be provided. Utilizing mating embossing dies or, for example, deformation pressure applied as by means of a round point stylus to a sheet of such plastic disposed upon a resilient backing, raised lettering and designs of sharply contrasting color values are produced thereon. Other cold forming operation producing similar cold flow deformation yields similar results.

The phenomena whereby such opacity or color change is produced is not completely understood; however, it is believed that the effects noted are, in general, attributable to various physical changes in the fine structure of the material prepared in accordance with the teachings of the invention. Such changes may involve one or more grain, micellar or laminar orientation, displacement or distortion effects produced, especially by cold flow and to varying degrees by severe internal stresses set up in the material as described hereinafter. For the purpose of producing labels, signs, packaging materials, constituting preferred applications of my invention, plastic sheet material ranging in thickness from a few mils to 30–40 mils or more are utilized. Materials in the range of about 0.003 to 0.020 inch in thickness are especially suitable for labels, identification tags and the like. With thicker materials than the foregoing, surface color effects are sometimes produced.

It will be appreciated that thicker sheet materials may be employed for producing, e.g., plaques, name-plates and the like, especially, when the size of the characters to be embossed thereon is commensurately larger than those of smaller labels, etc. Usually the degree of elongation or deformation with thin sheets is relatively greater than with thick sheet materials ranging from embossments projecting several times the thickness of the sheet above the surface thereof to sheet thickness or slightly less, with thin and thick sheets, respectively. In any event at least a portion of the deformed area is elongated to produce plastic flow beyond the cold yield point.

In general it has been found that suitable compositions can be produced from materials formulated and processed to produce sheeting having properties similar to those known in the trade as "rigid plastic sheeting." More particularly, straight unplasticized polyvinyl chloride and polyvinyl chloride-polyvinyl acetate copolymers including types I and II may be so employed; however, since the present results are believed to be due to the physical structure and properties of the sheeting other rigid plastics may be processed to yield a similar product. For present purposes the term "rigid" is intended to indicate a material for which the yield point occurs at a low degree of elongation and further elongation proceeds with viscoelastic stretching commonly termed "cold flow." Invariably the color change region is found to begin near the yield point and to extend to the point of film rupture. These polymeric synthetic resins are produced by suspension or emulsion polymerizing techniques yielding colorless transparent particles or agglomerates of particles varying in size from about 0.2 to 2.0 microns. Larger particle size virgin material or reclaimed and reprocessed materials may be formed to a somewhat similar fineness and processed similarly. Rigid plastic sheeting suitable for present purposes is normally manufactured from such a raw particulate plastic material by compounding with one or more stabilizers, pigments, dyes, plasticizers and lubricants and sheeting the compound on calenders, planishing presses or extruders operated at temperatures of the order of 250° to 350° F. Strangely, reclaimed materials usually impart superior properties perhaps because these materials generally contain larger proportions of gel-like materials produced by previous processing and aging experience. In each of these processes, the material is cooled to the final rigid state. subsequent to sheeting and annealing if necessary as noted hereinafter.

A rigid plastic sheet material whether sheeted from compounded or from uncompounded stock may be expected to be composite in nature and comprising tough or undispersed grain-like plastic regions of same degree of integrity cemented or adhering to adjacent regions with varying degrees of tenacity. These plastic regions of integrity may be the gel portions of the polymer, undispersed plastic particles, flattened and fragmented polymer particles as well as micellular and laminar contact surfaces. In uncompounded plastic material, e.g., of a self plasticized nature, low molecular weight polymer may serve as the cement binding the compacted, oriented and distorted tougher regions into a composite solid. The lubricants, stabilizers, pigments, plasticizers, etc., in compounded stocks are likewise distributed and combined in the various regions of the composite as dictated by compatibility and dispersability characteristics generally tending to favor softer portions of the plastic if compatible or being distributed between the various integral plastic particle regions if incompatible.

The described process of manufacture yields a sheeted composite material which is in an annealed state having a uniform normal color, which, in the following, is referred to as the background color. Alternatively, the compounded material may be sheeted on calenders operating in the lower portions of the above-indicated processing range (e.g., 250°–300° F.) whereat, depending upon the particular composition, severe stresses are retained in the calendered sheet especially if cooled rapidly. In this unannealed state color change effects may be noted; however, production of the desired fine structure is promoted by such cooler sheeting temperature. In the event that such cold sheeted material does not possess the normal background color due to the low processing temperature, the material is annealed by heating to temperatures of over 200° F. to about 325° F. as in a planishing press for a short time and cooled slowly as soon as the normal color is attained. Upon visual examination the annealed sheeted material appears to be essentially homogeneous and to possess an integral or continuous structure; however, when flexed or otherwise deformed beyond the critical yield point limit materials prepared as disclosed herein undergo a whitening or other change in light transmittivity or reflectivity properties. Electron photomicrographs at this point indicate that the composite structure fails in the cementing region exposing irregular particle surfaces which then serve as light scattering or diffracting surfaces.

While normal uncompounded polymers may be processed as indicated to obtain a suitable product, it is generally preferred to include stabilizers, lubricants, plasticizers and color agents to enhance the color change, provide decorative effects and improve processability as well as adjust the yield point to levels at which usual embossing equipment can produce the requisite cold flow deformation. Compounding formulations and processing techniques which tend to produce a composite structure are employed in contrast to general practice in the art which is directed to obtaining the highest degree of homogeneity.

Clear particulate vinyl thermoplastic resin supplied to the trade as indicated above and also materials dyed with a soluble dye either during manufacture or compounding may be employed in formulating the compound. Likewise, insoluble dyes or pigments can be employed to give the background color, e.g., red blue, yellow, clear, opalescent, etc. Pigments which do not possess high opacity, i.e., those in which the index of refracticity is in the range of slightly above that of the plastic (1.5 to 1.6) to below about 2.0, i.e., substantially below that of high opacity materials such as $TiO_2$, etc. are generally considered superior for present purposes. An excellent and therefore preferred material is aluminum hydrate (also termed aluminum trihydroxide or alumina hydroxide in the trade) of standard commercial form. Hydrated chromium hydroxide may be used similarly. The foregoing preferred materials yield opalescent clear sheet with clear plastic and colored sheet with dyed plastic. These materials may also be employed at least partially in the form of commercially available acid dye lake pigments to yield a colored sheet. Other pigments which may be substituted all or in part include magnesium silicate in the form of ground talc or steatite, whiting, celite (diatomaceous earth), bentonite, china and white clays and similar materials in fine particle size. Ordinarily, the amount of pigment which can be employed ranges from small amounts, about 1%, to an upper limit at which the material is no longer transparent or translucent in thin sections. Amounts in the range of 2% to 10% are generally satisfactory. Certain materials will be found usable in excess of 10% of the resin. Apparently, it is essential that the annealed compound be at least translucent in thin sections in order that incident light can pass through a sufficient thickness thereof to provide the background color and obtain adequate contrast.

Lubricants such as stearic acid and other materials are employed in amounts of tenths of a percent to several percent as well as stabilizers such as lead stearate, organotin, mixed barium-cadmium fatty acid soaps, dibasic lead phosphate, lead stearate, dibasic lead stearate, and the like, are included as in conventional practice. However, those that have lubricating power as well as said lubricants may be used in somewhat larger than usual amounts to promote formation of the desired structure. At least, in the case of unpigmented polyvinyl chloride plastic material which has been previously sheeted, a highly satisfactory product is produced by grinding to fine particle size and adding about 1% to 5% of a somewhat incompatible polymeric (e.g., aliphatic) or brittle resinous plasticizer (coumarone-indene) and then sheeting as in usual practice. Although these plasticizers are fluid or semi-fluid at processing temperatures they behave as solids at ambient temperatures and therefore function in somewhat the same fashion as the indicated pigments. Plasticizers employed are those having little softening action on the plastic particles at room temperature.

During mixing as in a Banbury mill and sheeting operations the indicated pigments, lubricants, stabilizers and/or incompatible plasticizers will become distributed to greater or lesser degree in the interstices between the plastic particles or other integral structure portions of the plastic. Orientation and layering of the composite structure in the sheet is greatest with calendering or extrusion and exists to a useful extent in planished sheet. The uniform clear transparent or translucent color appearance of the annealed sheet is taken to indicate that substantially no structural discontinuity, refractive index discontinuity or a relatively low level of such light diffractive properties exists in the annealed sheet insofar as present purposes are concerned. The sheet is divided into cards, sheets or tape for distribution purposes and as adapted for embossment in appropriate equipment.

With reference to the accompanying drawing, the cold-flow pressure-embossment may be very simply effected by cold working the sheet 6 in dies 7 and 8 having male and female die elements 11 and 12 for deforming the sheet into an embossed design as depicted at 13 in Figures 3 and 4. Temperatures below about 40° C. are generally satisfactory. Hand embossing machines presently used for embossing soft metal tape may be used for this purpose or high speed embossing presses may be similarly used. The only critical question in the embossing appears to be that the plastic material be strained to beyond its elastic limit or yield point to produce a permanently set cold-flow of the material in the embossed, i.e., raised areas. A round point stylus of small radius tip may be employed to "write" upon the rigid plastic sheet disposed upon a firm, resilient backing allowing convenient use even in the home. Mechanical presses employing a male die and a similar backing and other conventional cold indention equipment is usable for producing large embossed plaques, sheets, etc.

It is essential that in the raised areas formed by the embossing process the plastic material is stressed beyond the yield point and is cold drawn with considerable elongation which is retained as permanent set. Moreover, certain areas are also subjected to considerable pressure and other regions are bent, setting up internal stresses. In these embossed areas a very strongly contrasting color results. Material in which the background is, e.g., opalescent, clear or transparent or translucent dyed, usually becomes quite white and opaque in the embossed areas. In other cases, the material becomes a sharply contrasting opaque pastel shade or a different color is produced. In the case of the lake pigments, much darker or lighter shades are produced by mechanisms which are described hereinafter.

Various changes produced in the microscopic structure of the rigid plastics can account for the various color change effects noted. In the annealed rigid sheet there are apparently no sharp optical discontinuities, i.e., diffractive structures, to produce opaque or reflective effects and the adsorptive-reflective properties necessary to produce the embossment color are not present. During embossment with consequent cold flow and stressing various zones of the composite structure may slide along slippage planes produced by foregoing treatment with microscopic separations occurring so that sharp refractive index discontinuities, i.e., diffractive structures, develop in the separated areas which discontinuities are effective in refracting or diffracting light. Moreover, the interstices and surfaces of the plastic particles or micelles are covered or have a mixture of pigment, plasticizer, lubricant, etc., distributed therein having rough surfaces which are no longer in contact with plastic surfaces and therefore are able to scatter and reflect light more effectively due to greater refractive index discontinuities produced by stressing. If a colored pigment is present, colored light is reflected. The net effect of such structural changes, therefore, is to produce opaqueness, dilution of the color value by shortening or blocking transmission through colored material or the background color is either enhanced, altered or decreased in intensity. Orientation effects, both as to particles and molecules, may also be present since polarized light studies indicate various polarization and internal stress light patterns or changes are produced by said stressing. It will be appreciated that such an effect is generally avoided in conventional practice by manipulating at temperatures above about 50° C. to 60° C.

Curiously enough, heating of the embossed areas to above about the rubbery stage apparently allows annealing to take place with a relaxation of the stressed structure and the embossed area then regains the original background color. Simple tests suffice to select suitable rigid sheeting. If the material is cut with shears the edges appear opaque or contrast colored, in most cases. If a thin section is torn the highly elongated and torn areas undergo the color change. Proper annealing is evidenced by attainment of normal background color.

A preferred material is a plastic sheet having a thickness of approximately .010 inch and characterized in the trade as rigid in contradistinction to flexible and being composed of the copolymers of polyvinyl chloride and polyvinyl acetate compounded with color pigment and a filler of aluminum hydrate such as produced by the Bakelite Company of New York City, New York, under the trade definition of vinyl plastic rigid sheets and more fully described in a publication "Bakelite Plastics Vinyl Rigid Sheets Technical Data," copyrighted 1954 by Union Carbide and Carbon Corporation. This material is basically resin or resin mixtures which has been sheeted at high temperatures on a calender and is available as calendered rigid sheets or as planished rigid sheets which have been pressured into polished or matte-surface finish sheets in a multiple platen press.

The resin may be solely vinyl chloride or copolymers of vinyl chloride-acetate. The more or less standard base formula denoted in the trade as VCA–3381 is composed of copolymers of approximately 88% polyvinyl chloride and approximately 12% polyvinyl acetate. This copolymer is compounded with a small amount of stabilizer, lubricant, color pigment and reinforcing filler such as aluminum hydrate above noted. The pigment and aluminum hydrate should be included in a proportion of up to about 5% of the formulation. In the case of the compound used herein, the yield point is approximately 7,000 p.s.i.

Unplasticized, unfilled (unpigmented) virgin polyvinyl chloride rigid tape containing a small amount of lubricant and stabilizer sold under the trade name Genotherm by Farbwerhe Hoeckst A. G. is normally an opalescent blue-white semi-transparent color. Upon embossment as described the embossed area become an opaque white color. Similar material which is reworked, i.e., scrap ground to a fine particle size, combined with a 2% to 3% of plasticizer and sheet by calendering, is a superior material. The original color is translucent, opalescent, blue-white, with clear resinous plasticizer and becomes a very opaque white on embossment.

*Example*

A suitable rigid polyvinyl chloride resin sheet is formulated as follows:

| | Parts |
|---|---|
| Unplasticized clear PVC Type I | 100.0 |
| Organotin stabilizer | 0.5 |
| Barium-cadmium fatty acid soap | 0.5 |
| Aluminum hydrate | 2.0 |

The indicated mixture is premixed and then mixed in a Banbury mill heated to 300° F. until a semi-fused mix is obtained. While heated the mixture is fed into a four roll calender heated to about 275° to 300° F. and sheeted to desired thickness. The sheet is then cooled by passage, e.g., through a three or nine roll cooling mill and is then cut or slit to size. If necessary, the cut material is annealed by heating above 200° F. to establish the normal background color, i.e., a semi-transparent or translucent clear or whitish appearance. A similar procedure is employed when additional ingredients are added.

Plastic colors with which a more pronounced whitening effect is obtained include red, brown, green and blue. Yellow, too, orange and gray seem to be less effective possible because they offer less contrast.

With foregoing compounding considerations in mind, formulation of a large variety of rigid plastic sheeting products suitable for use in the process of the invention should be apparent to those skilled in the plastics art.

What is claimed is:

1. A method for producing plastic sheet articles having contrast color embossments comprising applying force to a rigid thermoplastic resin sheet to cause permanent cold flow deformation of said sheet corresponding to said embossment, said resin sheet comprising particulate thermoplastic resin selected from the group consisting of polyvinyl chloride and copolymers of polyvinyl chloride admixed with compounding agents and sheeted to provide an annealed micellar structure having an original uniform background color, said structure being disturbed by said deformation to produce the contrast color of said embossment.

2. The method as defined in claim 1 wherein said compounding agents include a lubricating agent.

3. The method as defined in claim 1 wherein said compounding agents include a stabilizer.

4. The method as defined in claim 1 wherein said compounding agents include a pigment material selected from the group consisting of aluminum hydrate, hydrated chromium hydroxide, magnesium silicate, whiting, diatomaceous earth, and clays.

5. A method for producing plastic sheet articles havin contrast color embossments and comprising applying force to a rigid thermoplastic resin sheet in which said resin is a material selected from the group consisting of polyvinyl chloride and copolymers of polyvinyl chloride to cause permanent cold flow deformation of said sheet corresponding to said embossment, said resin sheet comprising particulate thermoplastic resin, dye, lubricant, stabilizer and a pigment sheeted to provide an annealed micellar structure and a uniform background color said structure being disturbed by said deformation to produce said contrast color of said embossment.

6. The method as defined in claim 5 wherein said pigment is a material selected from the group consisting of aluminum hydrate, hydrated chromium hydroxide, magnesium silicate, whiting, diatomaceous earth, and clays.

7. The method as defined in claim 5 wherein said pigment comprises aluminum hydrate.

8. The method as defined in claim 5 wherein said pigment comprises hydrated chromium hydroxide.

9. The method as defined in claim 5 wherein said pigment comprises magnesium silicate.

10. The method as defined in claim 5 wherein said pigment comprises diatomaceous earth.

11. The method as defined in claim 5 wherein said pigment comprises clay.

12. The method as defined in claim 5 wherein said pigment comprises an acid lake dye of a material selected from the group consisting of aluminum hydrate and hydrated chromium hydroxide.

13. The method as defined in claim 2 wherein said resin sheet includes a solid incompatible plasticizer intermixed with and coating the granular resin micelles being of low opacity in the annealed state and high opacity in areas stressed to produce cold flow deformation.

References Cited in the file of this patent

UNITED STATES PATENTS

| | | |
|---|---|---|
| 1,924,800 | Nixon | Aug. 29, 1933 |
| 2,030,066 | Jenett | Feb. 11, 1936 |
| 2,224,208 | Miles | June 3, 1941 |
| 2,659,105 | Halbig et al. | Nov. 17, 1953 |

OTHER REFERENCES

Plastics Engineering Handbook (Society of the Plastics Ind. Inc.), 1954, Reinhold Publishing Corp., page 186.